Feb. 24, 1953    J. P. RUDOLPH    2,629,576

VALVE

Filed July 23, 1948

INVENTOR
JACOB P. RUDOLPH
BY
ATTORNEYS

Patented Feb. 24, 1953

2,629,576

UNITED STATES PATENT OFFICE 2,629,576

VALVE

Jacob P. Rudolph, North Arlington, N. J., assignor to Air Reduction Company, Incorporated, a corporation of New York Application July 23, 1948, Serial No. 40,207

2 Claims. (Cl. 251—31)

This invention relates to valves, and more particularly to valves of the type used on gas torches for controlling the flow of the torch gases.

The gas regulating valves on welding and cutting torches are in almost constant use and therefore valves of the kind in which the valve stem is sealed by valve stem packing of the usual type have not been altogether satisfactory for this purpose since the repeated operation of the valves causes the packing to become worn and permits leaks. The resulting wastage of gas is not only expensive but in the case of acetylene and certain other combustible gases may also be dangerous.

Valves of the diaphragm type in which a non-rotatable axially movable valve stem is sealed by a flexible diaphragm connected to it are more suitable for use on gas torches so far as their ability to withstand repeated operation without developing leaks is concerned, but as heretofore constructed, they possess certain disadvantages which make them impractical for use on gas torches. It has been necessary to make them from a large number of parts and this has made their manufacture more difficult and expensive than is warranted for simple torch valves. Moreover it has not been possible to make them small and compact enough to adapt them for use in the confined spaces of gas torches.

The principal object of this invention is to provide a diaphragm type valve which is simple in construction, small and compact, inexpensive to manufacture, and well suited for use on gas torches.

This object is achieved by associating with a small valve casing of simple design a valve stem assembly which comprises (1) a valve stem having at its inner end, and preferably formed integrally with it, a valve element adapted to cooperate with a valve seat in the casing; (2) a relatively thick and small-diameter diaphragm which is bonded or otherwise secured at its center portion to the valve stem; and (3) a diaphragm ring which coaxially surrounds the valve stem with its inner wall spaced from the valve stem and to the inner surface of which the diaphragm is bonded at its outer edge surface or throughout the major portion of its outer edge surface. The entire valve stem assembly is positionable as a unit in the valve casing and is secured therein by the provision of external threads on the diaphragm ring and cooperating internal threads on a portion of the valve casing whereby the assembly unit may be inserted in the valve casing and secured in place by screwing the diaphragm ring into the valve casing. The valve stem is then held by the diaphragm so that it is non-rotatable but is axially movable, suitable means being provided that is adapted upon manual operation to move the valve stem axially and thereby seat or unseat the valve element.

A valve embodying the invention is illustrated in the accompanying drawing, in which.

Figure 1:
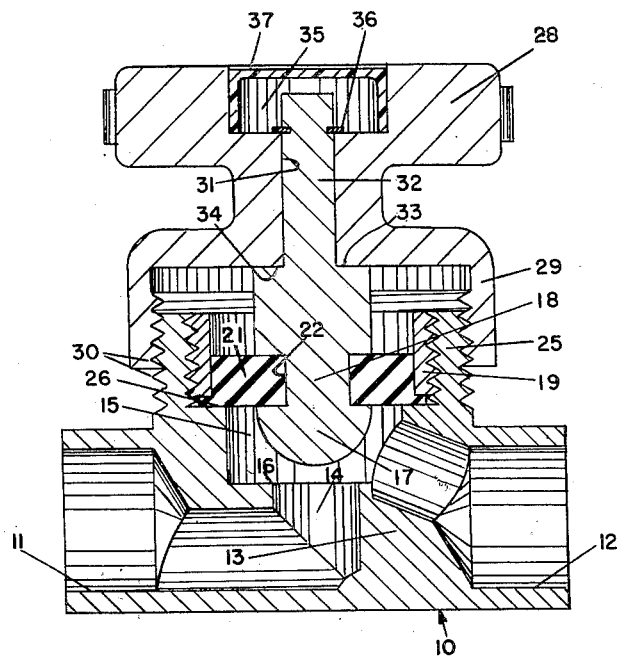
Figure 1 is a vertical section through the valve.

Referring first to Fig. 1, the valve has a casing 10 provided with an inlet connection 11 and an outlet connection 12 separated by a web or partition 13. The gas in flowing from the inlet to the outlet passes through a passage 14 which opens into the main gas chamber 15 of the valve. The corner 16 on the partition 13 where the passage 14 enters the gas chamber 15 constitutes an annular valve seat surrounding the passage 14. A valve element 17 cooperates with the seat 16 to control the flow of gas through the valve. The valve element is preferably the integral inner end of a valve stem 18 and may be given a hemispherical shape as shown.

Figure 2:
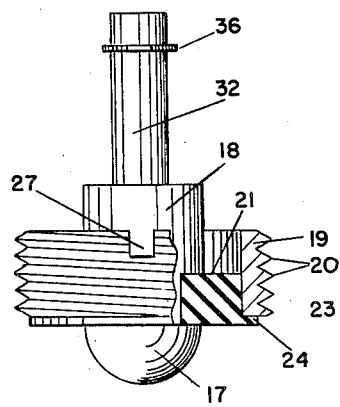
Fig. 2 is a side elevation, partly in section, of the valve stem assembly by itself.

The valve stem with its valve element forms part of a valve stem assembly shown by itself in Fig. 2. The assembly includes, in addition to the valve stem, an annular ring 19 coaxially surrounding the valve stem with its inner wall spaced radially from the valve stem and externally threaded as shown at 20, and a relatively thick flexible diaphragm 21 secured to the annular ring and to the valve stem. The diaphragm may be connected at its center portion in any suitable way to the valve stem, but preferably the diaphragm is provided with a central opening and the inner marginal portion of the diaphragm surrounding this opening is received within a groove 22 encircling the valve stem as best shown in Fig. 1. The portion of the diaphragm within the groove 22 is preferably bonded to the valve stem as hereinafter described. The outer edge of the diaphragm is bonded to the inner surface of the annular ring 19. Preferably the diaphragm has a small peripheral flange 24 which extends radially outward under the lower end of the annular ring 19. The function of this flange will be described later.

It will thus be seen that the three parts of the valve stem assembly, namely, the valve stem with its valve element, the diaphragm, and the annular diaphragm ring, are bonded together to form a single unit. This unit is positioned in the valve casing and retained therein by screwing the externally threaded diaphragm ring 19 into a threaded recess, formed in a neck portion 25 extending upwardly from the valve casing, until the lower edge of the diaphragm ring compresses the peripheral flange 24 on the diaphragm against a shoulder 26 formed on the valve casing at the bottom of the recess (Fig. 1). Of course the entire valve stem assembly rotates when the diaphragm ring is screwed in place because of the unitary nature of the assembly. Diametrically opposite notches are formed in the upper edge of the diaphragm ring 19. Only one of these notches appears in the drawing at 27 in Fig. 2. They are provided to accommodate a tool such as a screw driver or spanner wrench which may be used to facilitate screwing the diaphragm ring into the valve casing. The unitary nature of the valve stem assembly also permits the entire assembly to be removed as a unit, when desired, simply by unscrewing the diaphragm ring from the valve casing.

When the valve stem assembly is positioned in the valve casing the valve stem is held by the diaphragm so that it is non-rotatable but is axially movable. Axial movements of the valve stem move the hemispherical valve element 17 into and out of contact with the valve seat 16 to thereby seat or unseat the valve element. The axial movements may be imparted to the valve stem by any suitable means such as a handle 28 (Fig. 1) having an internally threaded skirt or cup portion 29 that receives the upwardly extending neck portion 25 of the valve casing, the neck portion having external threads 30 to cooperate with the internal threads of the skirt portion of the handle. Thus when the handle 28 is turned it moves up or down axially of the valve stem by reason of the threaded connection between the handle and the valve casing. The handle is provided with a central opening 31 which receives the end portion 32 of the valve stem. This portion of the valve stem is of reduced diameter, thus providing a shoulder 33 on the valve stem which abuts against a shoulder 34 on the handle at the lower end of the stem-receiving opening 31. The upper end of the valve stem projects into a recess 35 formed in the upper surface of the valve handle, and a spring clip 36 engaging in a recess in the valve stem bears against the bottom of the recess 35 in the handle and retains the handle on the valve stem. The recess 35 in the handle is provided with any suitable type of removable cover such as an inverted cup 37. This cover prevents dirt or foreign matter from accumulating around the portion of the valve stem that projects into the recess 35 of the handle. The handle 28 rotates freely on the reduced portion 32 of the valve stem and the axial movement of the handle produced by its threaded connection with the valve casing is imparted to the valve stem by the spring clip 36 and by the contacting shoulders 33 and 34 on the valve stem and the valve handle respectively.

When it is desired to remove the valve stem assembly the cover 37 on the handle is removed, the spring clip 36 is disengaged from the valve stem, and the handle is then rotated in a direction to unscrew it from the valve casing and move it upwardly off the valve stem. The valve stem assembly can then be removed as a unit by unscrewing the diaphragm ring 19 as above described.

The diaphragm 21 may be made of any suitable flexible material, and the bonding of the diaphragm to the valve stem and to the diaphragm ring 19 may be effected in any suitable way as by the use of a suitable adhesive or cement, but in the preferred construction the diaphragm is made of rubber, or a rubber composition, and is vulcanized to the valve stem and the diaphragm ring. As above stated the diaphragm is relatively thick, i. e. its thickness is preferably at least as great as one-tenth of its diameter. This gives the diaphragm enough rigidity to withstand the gas pressure in the valve chamber without becoming distended or permanently deformed and without the necessity of employing any kind of a diaphragm spring or stiffener plate to resist the gas pressure acting on the under side of the diaphragm. The relatively great thickness of the diaphragm also produces a desirable "positive action" feel when the handle 28 is rotated to open or close the valve. However, despite the stiff action purposely imparted to the diaphragm, it is flexible enough to allow the required amount of movement of the valve stem to move the valve element to fully-closed or fully-open position.

When diaphragms are as thick as the one used in the present valve the ordinary means of clamping them in position is not adequate. They cannot be satisfactorily anchored around their edges by clamping rings or other devices commonly employed, especially in restricted spaces, because the repeated flexing of the diaphragm either works the periphery of the diaphragm entirely loose from the clamping device or destroys the gas-tight seal. The bonding of the diaphragm to the valve stem and to the diaphragm ring as above described provides a permanent and secure anchor for the diaphragm. The diaphragm ring 19 does not clamp the entire edge portion of the diaphragm in the usual way but only clamps the small peripheral flange 24 to make sure that gas does not escape around the outside of the diaphragm ring, and even this flange on the diaphragm may be omitted if desired in which case the diaphragm ring is preferably screwed down far enough to bring its lower end directly against the shoulder 26 and thereby effect a seal with it, or a separate gasket may be provided at this place. When the flange 24 is omitted the bonding of the diaphragm to the ring 19 preferably extends throughout the entire edge surface of the diaphragm. While it cannot be correctly said that the bonding of the diaphragm to the ring extends throughout the entire edge surface of the diaphragm when the diaphragm is provided with the peripheral flange 24, nevertheless, as will be clear from Fig. 2, the bonding is throughout the major portion of the edge surface of the diaphragm as shown at 23. Although the peripheral flange 24 on the diaphragm constitutes a portion of the diaphragm it is not affected by movement of the diaphragm since the bonding of the major portion of the edge surface of the diaphragm to the inner surface of the diaphragm ring substantially overcomes all stresses.

It will now be seen that even though the valve is of the diaphragm type it is extremely simple and compact in construction, has a minimum number of parts, requires no diaphragm accessories such as springs or stiffener plates, is inexpensive to manufacture, and is well suited for use on gas torches instead of the usual type of valve having a valve stem packing.

I claim:
1. A valve for controlling the flow of a fluid comprising a casing having inlet and outlet connections and a passage surrounded by an annular valve seat through which the fluid flows from the inlet to the outlet, a valve element, a valve stem to which the valve element is connected, an externally threaded annular ring coaxially surrounding the valve stem with its inner wall spaced radially from the valve stem, a flexible diaphragm connected at its center portion to the valve stem and bonded throughout the major portion of its outer edge surface to the inner surface of said ring, the ring having a tool receiving portion and the valve casing having an internally threaded portion to receive said externally threaded ring whereby when the ring is threaded thereinto the ring and the valve seat are relatively non-movable, the valve stem with its valve element and the diaphragm along with the ring to which it is bonded constituting a unit inserted into the valve casing by screwing the ring into said threaded portion of the casing after which the valve stem is axially movable relative to the casing to seat and unseat the valve element, the diaphragm having a peripheral radially extending flange projecting under the inner end of the annular ring and the casing having a surface against which said flange is clamped when the annular ring is screwed into the casing, and means operatively connected to the valve stem for moving it axially.

2. A valve for controlling the flow of a fluid comprising a casing having inlet and outlet connections and a passage surrounded by an annular valve seat through which the fluid flows from the inlet to the outlet, a valve element, a valve stem to which the valve element is connected, an externally threaded annular ring coaxially surrounding the valve stem with its inner wall spaced radially from the valve stem, a flexible diaphragm connected at its center portion to the valve stem and bonded throughout the major portion of its outer edge surface to the inner surface of said ring, the ring having a tool receiving portion and the valve casing having an internally threaded portion to receive said externally threaded ring whereby when the ring is threaded thereinto the ring and the valve seat are relatively non-movable, the valve stem with its valve element and the diaphragm along with the ring to which it is bonded constituting a unit inserted into the valve casing by screwing the ring into said threaded portion of the casing after which the valve stem is axially movable relative to the casing to seat and unseat the valve element, the diaphragm having a peripheral radially extending flange projecting under the inner end of the annular ring and the casing having a surface against which said flange is clamped when the annular ring is screwed into the casing, the valve casing having an externally threaded portion, and a handle having an internally threaded skirt adapted to be threaded on the externally threaded portion of the valve casing and to engage the valve stem to move the valve element toward and away from the valve seat to close and open the valve.

JACOB P. RUDOLPH.

REFERENCES CITED

The following references are of record in the file of this patent:

UNITED STATES PATENTS

| Number | Name | Date |
| --- | --- | --- |
| 1,885,457 | Lord | Nov. 1, 1932 |
| 2,118,300 | Ford | May 24, 1938 |
| 2,439,760 | Thomas | Apr. 13, 1948 |
| 2,457,472 | Hufferd | Dec. 28, 1948 |

FOREIGN PATENTS

| Number | Country | Date |
| --- | --- | --- |
| 562,668 | France | of 1923 |
| 627,866 | Germany | of 1936 |